US012568300B2

(12) United States Patent
Sakato et al.

(10) Patent No.: US 12,568,300 B2
(45) Date of Patent: Mar. 3, 2026

(54) ELECTRONIC APPARATUS, METHOD FOR CONTROLLING ELECTRONIC APPARATUS, AND NON-TRANSITORY COMPUTER-READABLE STORAGE MEDIUM FOR GUI CONTROL ON A DISPLAY

(71) Applicant: CANON KABUSHIKI KAISHA, Tokyo (JP)

(72) Inventors: Kazuma Sakato, Kanagawa (JP); Hiroyasu Katagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 17/683,390

(22) Filed: Mar. 1, 2022

(65) Prior Publication Data

US 2022/0329740 A1 Oct. 13, 2022

Related U.S. Application Data

(63) Continuation of application No. PCT/JP2020/028738, filed on Jul. 27, 2020.

(30) Foreign Application Priority Data

Sep. 6, 2019 (JP) ................................. 2019-162729

(51) Int. Cl.
*H04N 23/63* (2023.01)
*G06T 7/20* (2017.01)
(Continued)

(52) U.S. Cl.
CPC ............. *H04N 23/632* (2023.01); *G06T 7/20* (2013.01); *G06T 7/70* (2017.01); *G06V 40/161* (2022.01);
(Continued)

(58) Field of Classification Search
None
See application file for complete search history.

(56) References Cited

U.S. PATENT DOCUMENTS 5,541,655 A 7/1996 Kaneda
5,627,586 A * 5/1997 Yamasaki .............. H04N 23/61
348/700
(Continued)

FOREIGN PATENT DOCUMENTS

JP H05-304631 A 11/1993
JP H07-283994 A 10/1995
(Continued)

OTHER PUBLICATIONS

Jul. 1, 2024 Korean Official Action in Korean Patent Appln. No. 10-2022-7009848.
(Continued)

*Primary Examiner* — Stuart D Bennett
(74) *Attorney, Agent, or Firm* — Venable LLP

(57) ABSTRACT

An electronic apparatus includes: a display control unit configured to display an input image, a first GUI image, and a second GUI image at a display; a first detecting unit configured to detect a position of a predetermined object in the input image; and a second detecting unit configured to detect a viewpoint of a user in the input image, wherein the display control unit displays the first GUI image in a position corresponding to the position of the predetermined object detected by the first detecting unit and the second GUI image in a position corresponding to the viewpoint detected by the second detecting unit, and in a case where the first GUI image and the second GUI image overlap, the display control unit makes the second GUI image less noticeable than in a case where the first GUI image and the second GUI image do not overlap.

11 Claims, 13 Drawing Sheets

(51) Int. Cl.

| | |
|---|---|
| *G06T 7/70* | (2017.01) |
| *G06V 40/16* | (2022.01) |
| *G06V 40/18* | (2022.01) |
| *H04N 5/262* | (2006.01) |
| *H04N 23/611* | (2023.01) |

(52) U.S. Cl.

CPC ........... *G06V 40/18* (2022.01); *H04N 5/2628* (2013.01); *H04N 23/611* (2023.01); *G06T 2200/24* (2013.01); *G06T 2207/30201* (2013.01)

(56)     References Cited

U.S. PATENT DOCUMENTS

| | | | | |
|---|---|---|---|---|
| 6,072,489 | A | * | 6/2000 | Gough .................. G06F 3/0481 |
| | | | | 715/803 |
| 6,246,437 | B1 | | 6/2001 | Kaneda |
| 10,542,206 | B2 | | 1/2020 | Kimura |
| 10,924,665 | B2 | | 2/2021 | Kanda |
| 2014/0164957 | A1 | * | 6/2014 | Shin ...................... H04L 65/403 |
| | | | | 715/806 |
| 2015/0055821 | A1 | * | 2/2015 | Fotland ................ G06V 10/255 |
| | | | | 382/103 |
| 2015/0331486 | A1 | | 11/2015 | Okubo |
| 2017/0262168 | A1 | * | 9/2017 | Xu ...................... G06F 3/04883 |
| 2018/0165879 | A1 | | 6/2018 | Holzer |
| 2018/0227481 | A1 | * | 8/2018 | Kimura .................. H04N 23/63 |
| 2019/0005361 | A1 | | 1/2019 | Cho |

| | | | |
|---|---|---|---|
| 2019/0028640 | A1 | 1/2019 | Kanda |
| 2020/0137299 | A1 | 4/2020 | Kimura |
| 2020/0302657 | A1 * | 9/2020 | Shimazu ................ H04N 23/54 |

FOREIGN PATENT DOCUMENTS

| | | |
|---|---|---|
| JP | H08-125906 A | 5/1996 |
| JP | 2005-140880 A | 6/2005 |
| JP | 2007-133027 A | 5/2007 |
| JP | 2014-068280 A | 4/2014 |
| JP | 2017-224909 A | 12/2017 |
| JP | 2018-129659 A | 8/2018 |
| JP | 2018-205648 A | 12/2018 |
| KR | 10-2014-0037730 A | 3/2014 |
| KR | 10-2018-0123117 A | 11/2018 |

OTHER PUBLICATIONS

Dec. 3, 2024 Chinese Official Action in Chinese Patent Appln. No. 202080062416.X.

Oct. 16, 2023 Korean Official Action in Korean Patent Appln. No. 10-2022-7009848.

Aug. 11, 2023 European Official Action in European Patent Appln. No. 20860588.1.

Jul. 12, 2024 Chinese Official Action in Chinese Patent Appln. No. 202080062416.X.

International Search Report and Written Opinion for International Patent Application No. PCT/JP2020/028738.

Mar. 14, 2025 Chinese Official Action in Chinese Patent Appln. No. 202080062416.X.

* cited by examiner

Y-AXIS
DIRECTION

Z-AXIS
DIRECTION

X-AXIS
DIRECTION

301

300

302

ESTIMATED VIEWPOINT A

ACTUAL
VIEWPOINT B

ESTIMATED
VIEWPOINT C

CALIBRATION
INDEX FOR WORK

X-AXIS
DIRECTION

Y-AXIS
DIRECTION

Z-AXIS
DIRECTION

FIG. 6

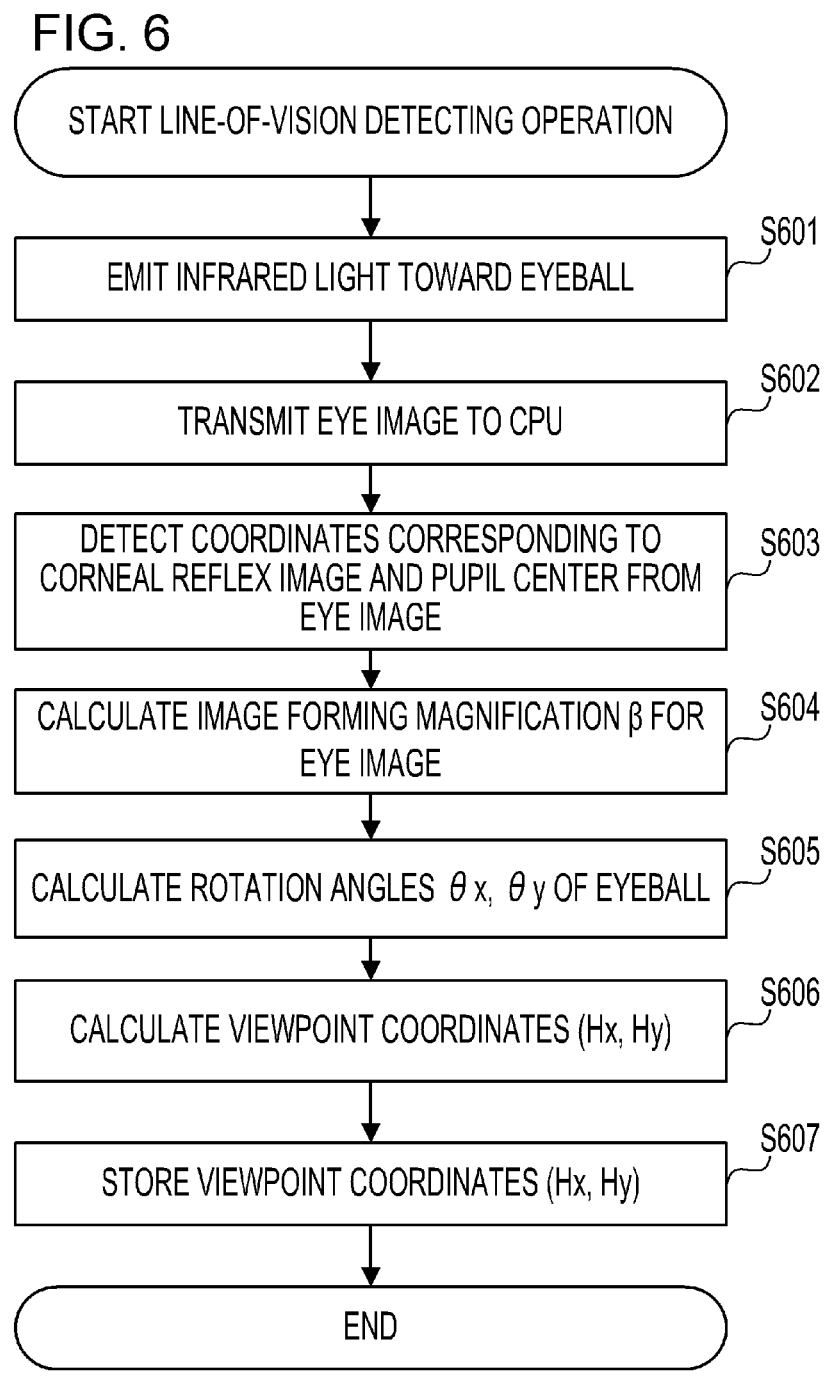

START LINE-OF-VISION DETECTING OPERATION

EMIT INFRARED LIGHT TOWARD EYEBALL          S601

TRANSMIT EYE IMAGE TO CPU          S602

DETECT COORDINATES CORRESPONDING TO CORNEAL REFLEX IMAGE AND PUPIL CENTER FROM EYE IMAGE          S603

CALCULATE IMAGE FORMING MAGNIFICATION β FOR EYE IMAGE          S604

CALCULATE ROTATION ANGLES $\theta x$, $\theta y$ OF EYEBALL          S605

CALCULATE VIEWPOINT COORDINATES (Hx, Hy)          S606

STORE VIEWPOINT COORDINATES (Hx, Hy)          S607

END

TRACKING RELIABILITY : 90

TRACKING RELIABILITY : 70

TRACKING RELIABILITY : 50

TRACKING RELIABILITY : 10

FIG. 9A
TRACKING RELIABILITY : 90
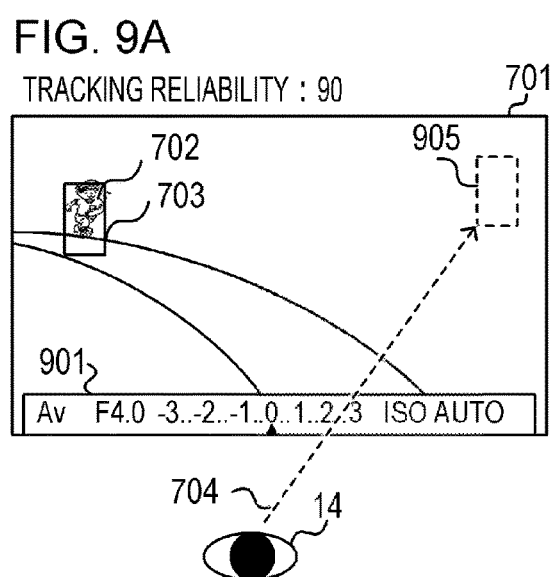
FIG. 9B
TRACKING RELIABILITY : 80
FIG. 9C
TRACKING RELIABILITY : 60
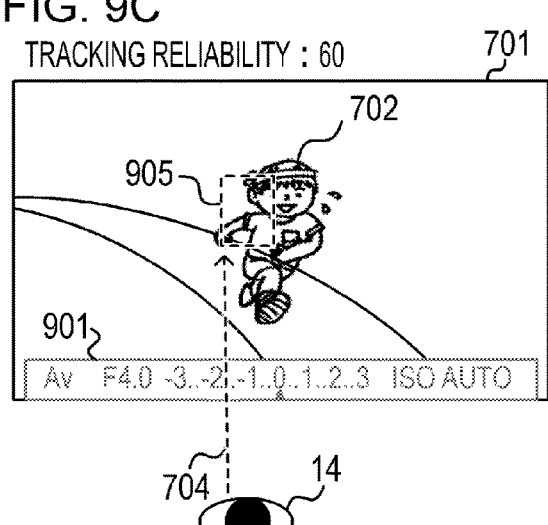
FIG. 9D
TRACKING RELIABILITY : 90
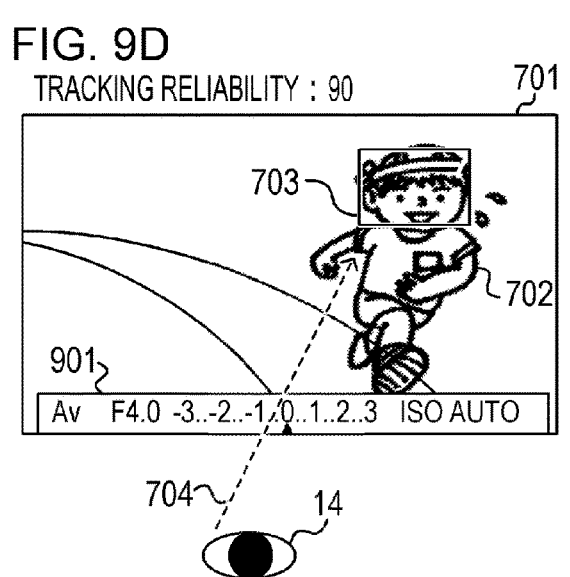

TRACKING RELIABILITY : 90

TRACKING RELIABILITY : 80

TRACKING RELIABILITY : 60

TRACKING RELIABILITY : 90

FIG. 13

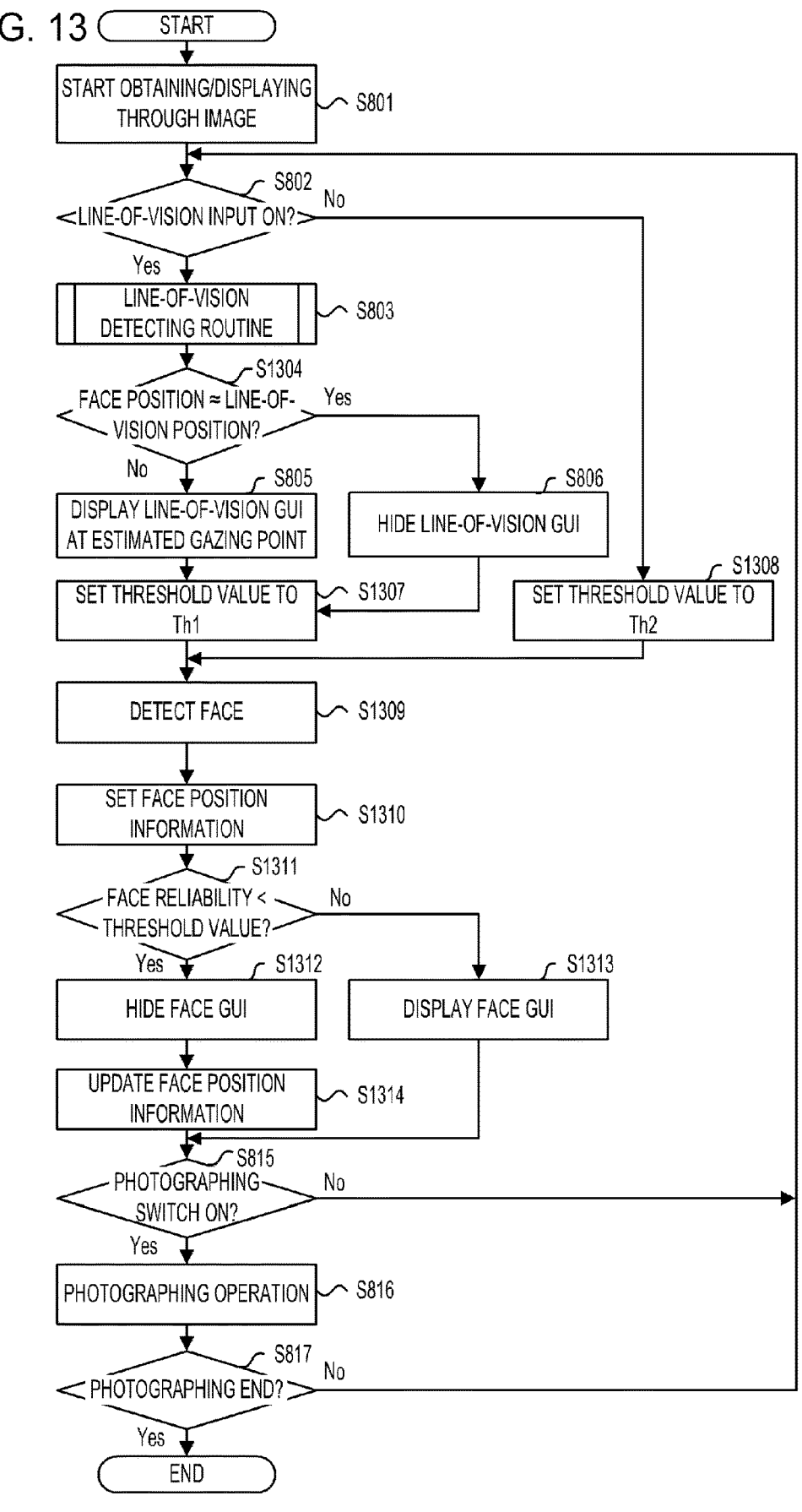

START

START OBTAINING/DISPLAYING THROUGH IMAGE — S801

S802 — LINE-OF-VISION INPUT ON? — No

Yes

LINE-OF-VISION DETECTING ROUTINE — S803

S1304 — FACE POSITION ≈ LINE-OF-VISION POSITION? — Yes

No

DISPLAY LINE-OF-VISION GUI AT ESTIMATED GAZING POINT — S805

HIDE LINE-OF-VISION GUI — S806

SET THRESHOLD VALUE TO Th1 — S1307

SET THRESHOLD VALUE TO Th2 — S1308

DETECT FACE — S1309

SET FACE POSITION INFORMATION — S1310

S1311 — FACE RELIABILITY < THRESHOLD VALUE? — No

Yes — S1312

HIDE FACE GUI

DISPLAY FACE GUI — S1313

UPDATE FACE POSITION INFORMATION — S1314

S815 — PHOTOGRAPHING SWITCH ON? — No

Yes

PHOTOGRAPHING OPERATION — S816

S817 — PHOTOGRAPHING END? — No

Yes

END

ELECTRONIC APPARATUS, METHOD FOR CONTROLLING ELECTRONIC APPARATUS, AND NON-TRANSITORY COMPUTER-READABLE STORAGE MEDIUM FOR GUI CONTROL ON A DISPLAY

CROSS-REFERENCE TO RELATED APPLICATIONS

This application is a Continuation of International Patent Application No. PCT/JP2020/028738, filed Jul. 27, 2020, which claims the benefit of Japanese Patent Application No. 2019-162729, filed Sep. 6, 2019, both of which are hereby incorporated by reference herein in their entirety.

BACKGROUND OF THE INVENTION

Field of the Invention

The present invention relates to an electronic apparatus, a method for controlling an electronic apparatus, and a non-transitory computer readable storage medium.

Background Art

In recent years, cameras have become more automated and intelligent, and techniques for detecting an object intended by the user on the basis of information about the line of vision position of the user looking into the view finder (line-of-vision information; line of vision input information) and performing focus control without manually inputting the position of the object have been proposed. PTL 1 discloses a technique for improving the accuracy of object detection by correcting the area detected as the area of the object using the line-of-vision information.

When a Graphical User Interface (GUI) image is displayed in an area other than an area desired by the user (the area the user wishes to see) in obtaining the user's line of vision position, the user's line of vision tends to be directed to the displayed GUI image, and it is difficult to keep the line of vision in the desired area. Therefore, even if line-of-vision information is used, the position of the area detected as the area of the object and the actual position of the object may be shifted from each other.

CITATION LIST

Patent Literature

PTL 1 Japanese Patent Application Publication No. 2018-205648

SUMMARY OF THE INVENTION

It is therefore the present invention to allow the user's line of vision to be more easily directed to a desired area.

An aspect of the present invention is: an electronic apparatus including at least one memory and at least one processor which function as: a display control unit configured to display an input image, a first GUI image, and a second GUI image at a display; a first detecting unit configured to detect a position of a predetermined object in the input image; and a second detecting unit configured to detect a viewpoint of a user in the input image, wherein the display control unit displays the first GUI image in a position corresponding to the position of the predetermined object detected by the first detecting unit and displays the second GUI image in a position corresponding to the viewpoint detected by the second detecting unit, and in a case where the first GUI image and the second GUI image overlap, the display control unit makes the second GUI image less noticeable than in a case where the first GUI image and the second GUI image do not overlap.

Further features of the present invention will become apparent from the following description of exemplary embodiments with reference to the attached drawings.

BRIEF DESCRIPTION OF THE DRAWINGS

FIG. 6 is a flowchart for illustrating line-of-vision detecting operation according to the embodiment;

FIGS. 9A to 9D illustrate examples of display of a live view image according to the first embodiment;

FIG. 13 is a flowchart for illustrating face detecting processing according to the third embodiment.

DESCRIPTION OF THE EMBODIMENTS

Preferred embodiments of the invention will be described in conjunction with the accompanying drawings.

(First Embodiment) <Description of Configuration>

Figure 1:
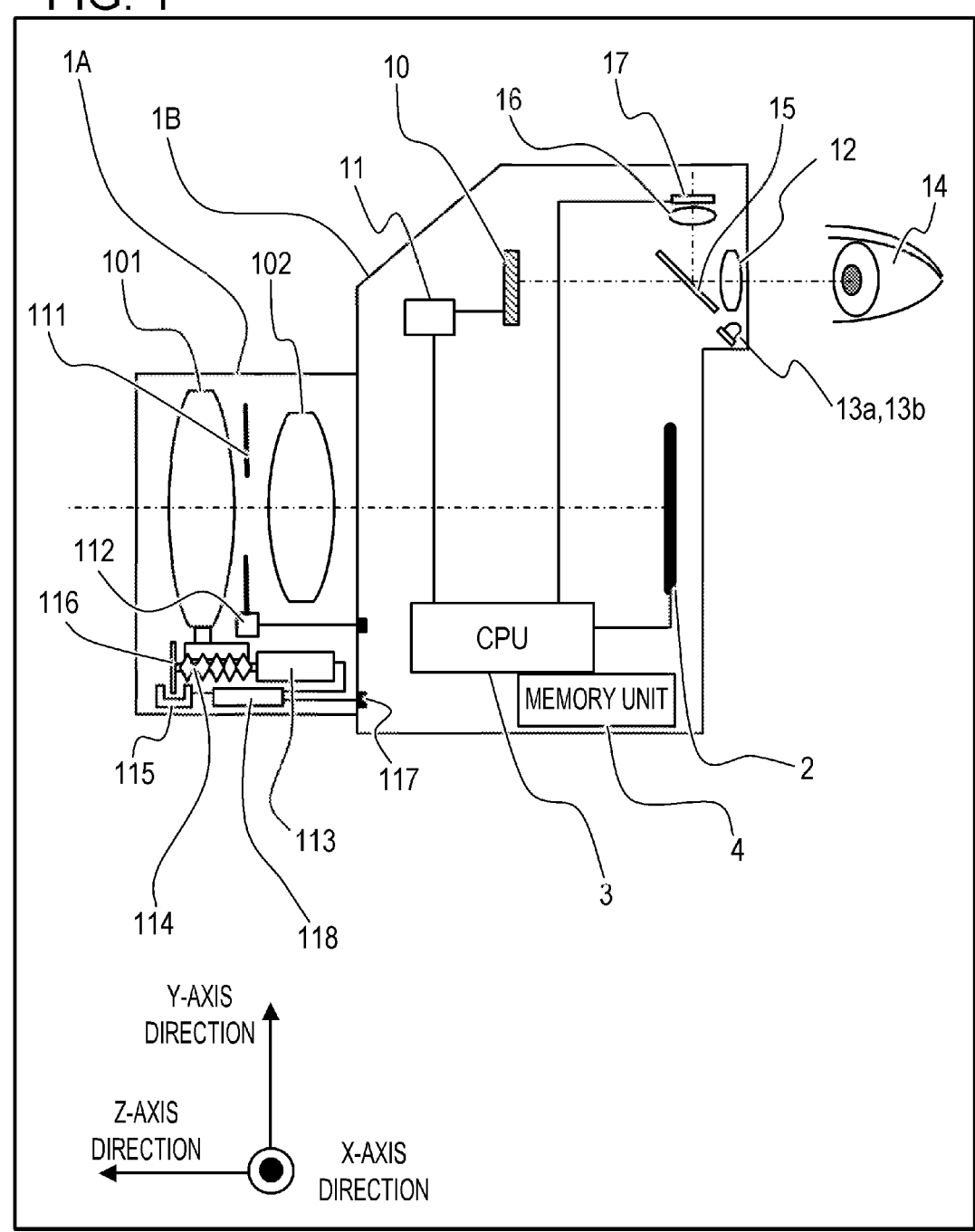
FIG. 1 is a cross sectional view of a camera according to an embodiment of the invention.

FIG. 1 is a cross-sectional view of a camera 1 (a digital still camera; an interchangeable lens camera) according to the embodiment and shows the general internal configuration of the camera 1. The camera 1 includes a photographic lens unit 1A and a camera housing 1B.

The photographic lens unit 1A includes two lenses 101 and 102, a diaphragm 111, a diaphragm driving unit 112, a lens driving motor 113, a lens driving member 114, a photocoupler 115, a pulse plate 116, a mount contact 117, and a focusing circuit 118. The lens driving member 114 includes a driving gear, and the photocoupler 115 detects the rotation of the pulse plate 116 linked to the lens driving member 114 and transmits the detection to the focusing circuit 118. The focusing circuit 118 drives the lens driving motor 113 on the basis of information from the photocoupler 115 and information from the camera housing 1B (information about the lens driving amount) and changes the focus position by moving the lens 101. The mount contact 117 is an interface between the photographic lens unit 1A and the camera housing 1B. For the sake of simplicity, the two lenses 101 and 102 are shown, but in reality, more than two lenses are included in the photographic lens unit 1A.

The camera housing 1B stores an image-sensing device 2, a CPU 3, a memory unit 4, a display device 10, a display device driving circuit 11, and an eyepiece lens 12. The image-sensing device 2 is provided at the surface of the photographic lens unit 1A to have an image formed thereon. The CPU 3 is the central processing unit of a microcomputer and controls the entire camera 1. The memory unit 4 stores for example images captured by the image-sensing device 2. The display device 10 includes liquid crystal and other elements and displays for example a captured image (a subject image). The display device driving circuit 11 drives the display device 10. The eyepiece lens 12 is a lens used for observing an image displayed at the display device 10 (an image for visual recognition).

The camera housing 1B also stores light sources 13a and 13b, an optical divider 15, a light receiving lens 16, and an image-sensing device for eye 17. Each of the light sources 13a and 13b is a conventional light source for use in a single-lens reflex camera to detect the direction of line of vision on the basis of the relation between a reflection image by corneal reflex (a corneal reflex image) and the pupil and to illuminate the user's eyeball 14. Specifically, the light sources 13a and 13b may be infrared light emitting diodes which emit infrared light to which the user is insensitive and are arranged around the eyepiece lens 12. An optical image of the illuminated eyeball 14 (an eyeball image; an image formed by light emitted from the light sources 13a and 13b and reflected by the eyeball 14) is transmitted through the eyepiece lens 12 and is reflected by the optical divider 15. The image of the eyeball is then formed by the light receiving lens 16 on the image-sensing device for eye 17 having a two-dimensional arrangement of photoelectric converting elements such as CCDs. The light receiving lens 16 positions the pupil of the eyeball 14 and the image-sensing device for eye 17 in a conjugate image-forming relation. The direction of line of vision (the viewpoint in the viewing image) is detected from the position of the corneal reflex image in the eyeball image formed on the image-sensing device for eye 17 using a predetermined algorithm which will be described.

Figure 2:
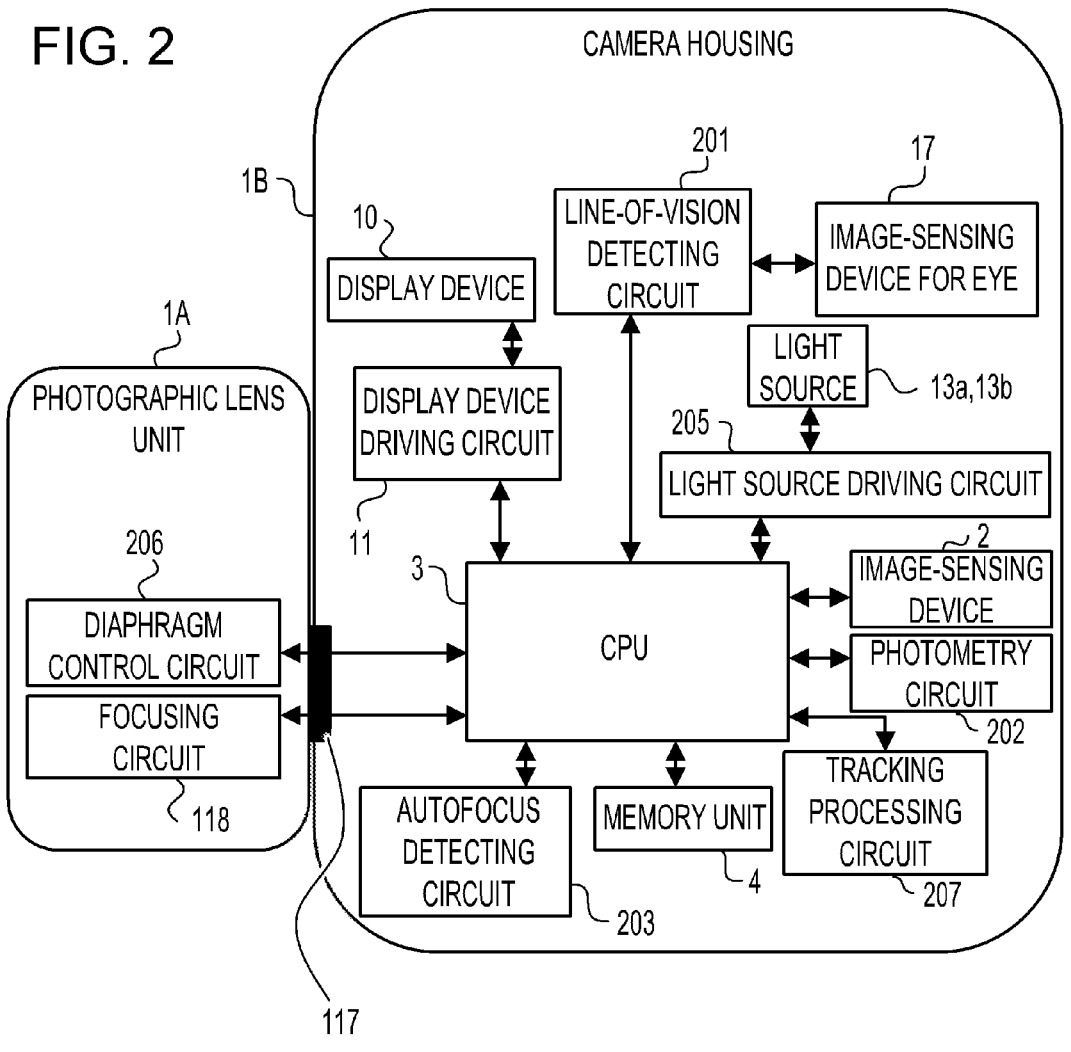
FIG. 2 is a block diagram of the camera according to the embodiment.

FIG. 2 is a block diagram of the electrical configuration in the camera 1. The CPU 3 is connected with a line-of-vision detecting circuit 201, a photometry circuit 202, an automatic focus detecting circuit 203, a display device driving circuit 11, a light source driving circuit 205, and a tracking processing circuit 207. The CPU 3 transfers a signal to the focusing circuit 118 provided in the photographic lens unit 1A and the diaphragm control circuit 206 included in the diaphragm driving unit 112 in the photographic lens unit 1A through the mount contact 117. The memory unit 4 associated with the CPU 3 has the function of storing image-sensing signals from the image-sensing device 2 and the image-sensing device for eye 17 and the function of storing line-of-vision correction parameters for correcting individual difference in line of vision which will be described.

The line-of-vision detecting circuit 201 A/D-converts the output of the image-sensing device for eye 17 (an eye image obtained by capturing an image of the eye) while the eye image is formed on the image-sensing device for eye 17 (CCD-EYE) and transmits the result to the CPU 3. The CPU 3 extracts feature points necessary for line-of-vision detection operation from the eye image according to a predetermined algorithm which will be described and calculates the user's line of vision (a viewpoint in an image for visual recognition) from the position of the feature points.

The photometry circuit 202 amplifies, logarithmically compresses, or A/D converts a signal obtained from the image-sensing device 2, which also serves as a photometry sensor, specifically a brightness signal corresponding to the brightness of the subject field and transmits the result to the CPU 3 as subject field brightness information.

The automatic focus detecting circuit 203 A/D converts signal voltages from a plurality of detecting elements (multiple pixels) included in the CCDs in the image-sensing device 2 and used for phase difference detection and transmits the result to the CPU 3. The CPU 3 calculates the distance to the subject corresponding to each focus detection point from the signals from the plurality of detecting elements. This is a technique known as image plane phase difference detection AF. According to the embodiment, it is assumed as an example that there are focus detection points at 180 locations on the image-sensing surface corresponding to 180 locations shown in a field-of-view image in the viewfinder (an image for visual recognition) in FIG. 3A.

The tracking processing circuit 207 performs object tracking processing on the basis of an image captured by the image-sensing device 2. Specifically, the tracking processing circuit 207 performs matching processing between the current frame image (the present frame image) and the reference image, and extracts (detects), from the current frame image, the area with the highest similarity (correlation) to the reference image as the area of the tracking target. According to the embodiment, the reference image is an image (a partial image) of the area detected as the area of the tracking target in the previous frame image (the frame image before the current frame image). The similarity may be similarity between the feature quantities of the images. Then, the tracking processing circuit 207 determines whether to continue tracking according to the similarity. The tracking processing circuit 207 calculates tracking reliability (the reliability of the tracking processing; a tracking status value) on the basis of the similarity corresponding to the detected area and transmits the result to the CPU 3. The tracking processing is performed, for example, for autofocus control, and the tracking reliability is used, for example, for display control of a GUI which displays the subject.

Figure 3A:
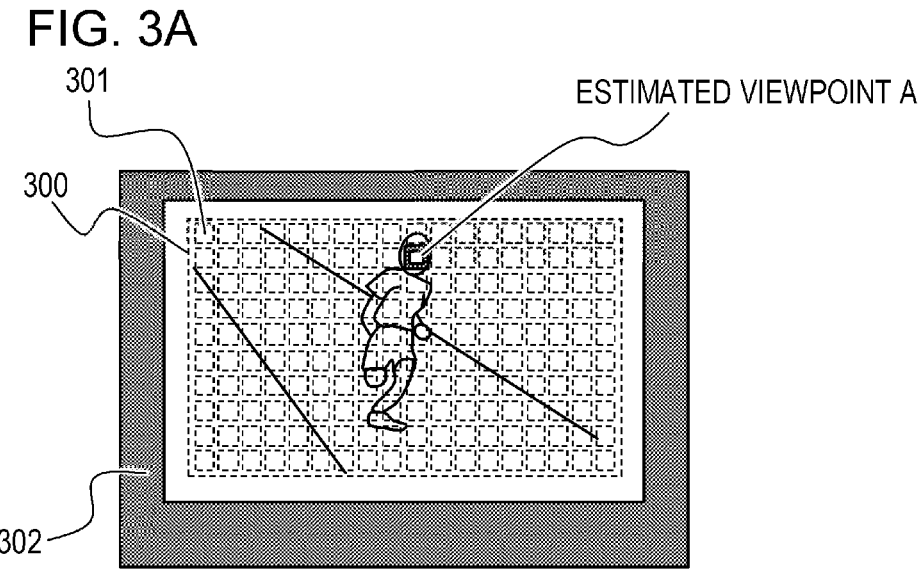
FIGS. 3A to 3C are views for illustrating the field of view in the view finder according to the embodiment.

FIG. 3A shows the field of view in the view finder, while the display device 10 is in an operating state (displaying an image for visual recognition). As shown in FIG. 3A, the field of view in the viewfinder may include a focus detection area 300, 180 range-finding indicators 301, and a field-of-view mask 302. Each of the 180 range-finding indicators 301 is superimposed on a through image (a live view image) displayed at the display device 10 so that these indicators are displayed at the positions corresponding to the focus detection points on the image-sensing surface. Among the 180 range-finding indicators 301, the range-finding indicator 301 corresponding to the current viewpoint A (an estimated position) is highlighted for example with a frame.

<Description of Line-of-Vision Detecting Operation>

Figure 4:
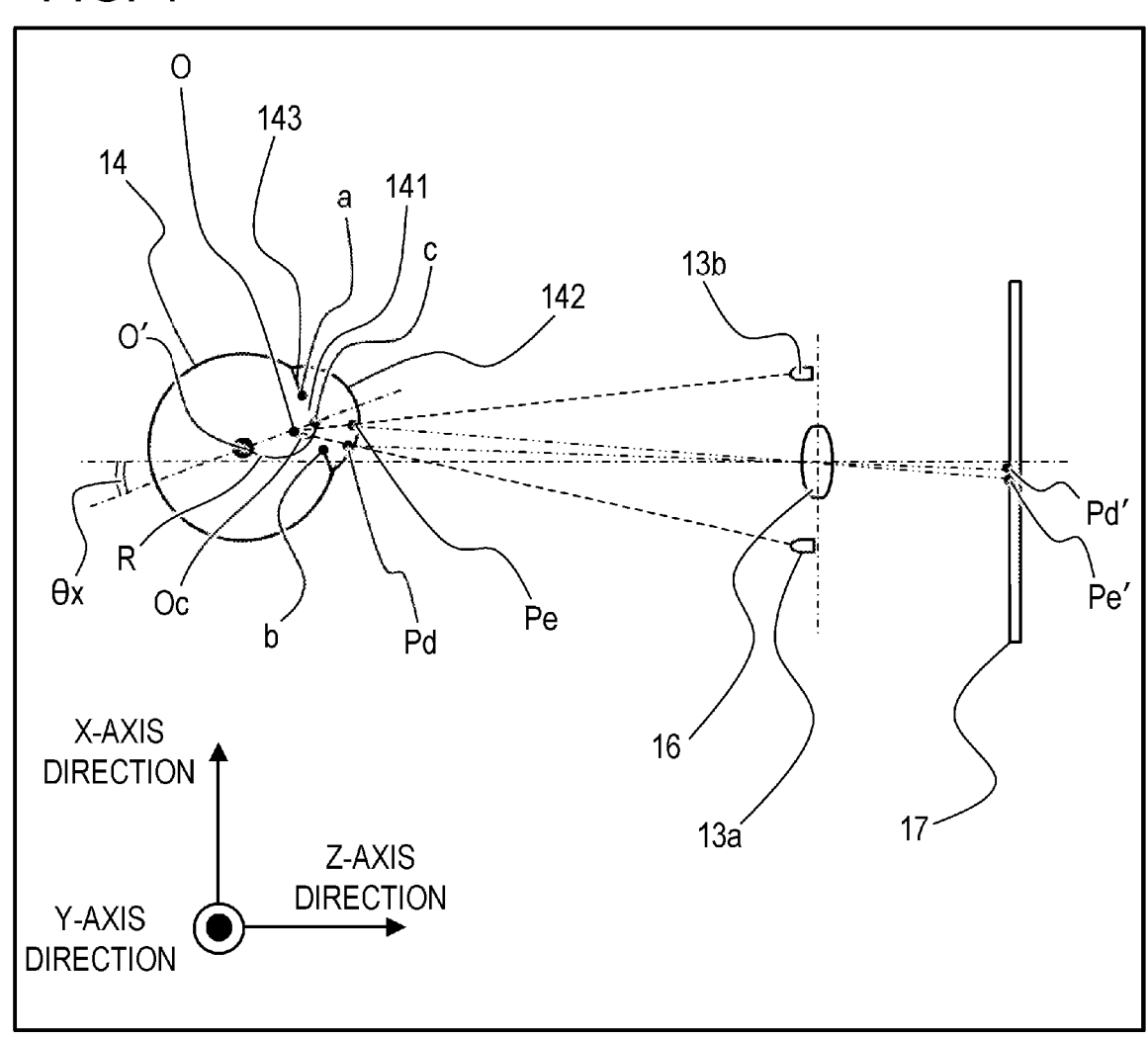
FIG. 4 is a view for illustrating the principle of a method for detecting a field of view according to the embodiment.
Figures 5A, 5B:
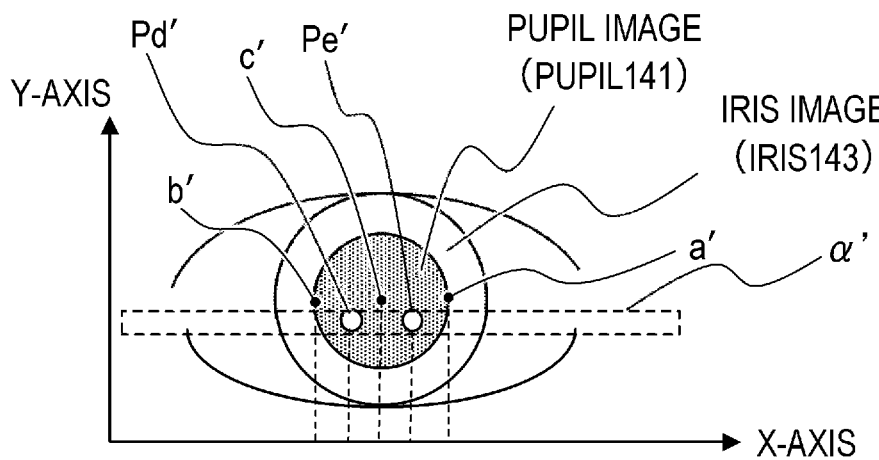
FIGS. 5A and 5B illustrate an eye image according to the embodiment.

With reference to FIGS. 4, 5A, 5B, and 6, a line-of-vision detecting method will be described. FIG. 4 illustrates the principle of the line-of-vision detecting method and is a schematic view of an optical system for line-of-vision detection. As shown in FIG. 4, the light sources 13a and 13b are positioned substantially symmetrically with respect to the optical axis of the light receiving lens 16 and illuminate the user's eyeball 14. A part of the light emitted from the light sources 13a and 13b and reflected by the eyeball 14 is captured by the light receiving lens 16 and collected by the image-sensing device for eye 17. FIG. 5A schematically illustrates an eye image captured by the image-sensing device for eye 17 (an eye image projected on the image-sensing device for eye 17), and FIG. 5B illustrates the output intensity of the CCD in the image-sensing device for eye 17. FIG. 6 is a flowchart for schematically illustrating the line-of-vision detecting operation.

When the line-of-vision detecting operation starts, the light sources 13a and 13b emit infrared light toward the user's eyeball 14 in step S601 in FIG. 6. An image of the user's eyeball illuminated by the infrared light is formed on the image-sensing device for eye 17 through the light receiving lens 16 and subjected to photoelectric conversion by the image-sensing device for eye 17. In this way, an electrical signal for a processable eye image can be obtained.

In step S602, the line-of-vision detecting circuit 201 transmits the eye image (the eye image signal; the electrical signal for the eye image) obtained from the image-sensing device for eye 17 to the CPU 3.

In step S603, the CPU 3 obtains the coordinates of the points corresponding to the corneal reflex images Pd and Pe for the light sources 13a and 13b and the pupil center c from the eye image obtained in step S602.

The infrared light emitted from the light sources 13a and 13b illuminates the cornea 142 of the user's eyeball 14. At the time, the corneal reflex images Pd and Pe, which are formed by a part of the infrared light reflected from the surface of the cornea 142, are focused by the light receiving lens 16 and formed on the image-sensing device for eye 17 to be corneal reflex images Pd' and Pe' in the eye image. Similarly, a light flux from the edges a and b of the pupil 141 is also focused on the image-sensing device for eye 17 to form pupil edge images a' and b' in the eye image.

FIG. 5B illustrates brightness information (a brightness distribution) about the area α' in the eye image in FIG. 5A. FIG. 5B illustrates a brightness distribution in the X-axis direction where the horizontal direction of the eye image is the X-axis direction, and the vertical direction is the Y-axis direction. According to the embodiment, the coordinates of the corneal reflex images Pd' and Pe' in the X-axis direction (the horizontal direction) are Xd and Xe, and the coordinates of the pupil edge images a' and b' in the X-axis direction (the horizontal direction) are Xa and Xb. As shown in FIG. 5B, at the coordinates Xd and Xe of the corneal reflex images Pd' and Pe' have extremely high brightness levels. In the area from coordinates Xa to Xb which corresponds to the area of the pupil 141 (the area of the pupil image obtained when the light flux from the pupil 141 forms an image on the image-sensing device for eye 17) has extremely low levels of brightness except for the coordinates Xd and Xe. Then, intermediate brightness between the above two levels of brightness is obtained in the area of the iris 143 outside the pupil 141 (the area of the iris image outside of the pupil image formed by the light flux from the iris 143). Specifically, the intermediate brightness between the above two levels of brightness is obtained in the area where the X coordinate (the coordinate in the X-axis direction) is smaller than the coordinate Xa and in the area where the X coordinate is larger than the coordinate Xb.

From the brightness distribution shown in FIG. 5B, the X-coordinates Xd and Xe of the corneal reflex images Pd' and Pe' and the X coordinates Xa and Xb of the pupil edge images a' and b' can be obtained. Specifically, the coordinates with extremely high brightness levels can be obtained as the coordinates of the corneal reflex images Pd' and Pe', and the coordinates with extremely low brightness levels can be obtained as the coordinates of the pupil edge images a' and 'b'. When the rotation angle θx of the optical axis of the eyeball 14 with respect to the optical axis of the light receiving lens 16 is small, the coordinate Xc of the pupil center image c' (the center of the pupil image) formed by the light flux from the pupil center c on the image-sensing device for eye 17 can be expressed as Xc≈(Xa+Xb)/2. In other words, the coordinate Xc of the pupil center image c' can be calculated from the X coordinates Xa and Xb of the pupil edge images a' and b'. In this way, the coordinates of the corneal reflex images Pd' and Pe' and the coordinates of the pupil center image c' can be estimated.

In step S604, the CPU 3 calculates the image formation magnification β of the eyeball image. The image formation magnification β is a magnification determined by the position of the eyeball 14 with respect to the light receiving lens 16 and can be obtained using a function of the distance (Xd−Xe) between the corneal reflex images Pd' and Pe'.

In step S605, the CPU 3 calculates the angle of rotation of the optical axis of the eyeball 14 with respect to the optical axis of the light receiving lens 16. The X coordinate of the midpoint between the corneal reflex image Pd and the corneal reflex image Pe and the X coordinate of the curvature center O of the cornea 142 substantially coincide. Therefore, when the standard distance from the center of curvature O of the cornea 142 to the center c of the pupil 141 is Oc, the rotation angle θx of the eyeball 14 in the Z-X plane (plane perpendicular to the Y-axis) can be calculated using the following Expression 1. The rotation angle θy of the eyeball 14 in the Z-Y plane (the plane perpendicular to the X-axis) can also be calculated in the same manner as the method for calculating the rotation angle θx.

$$\beta \times Oc \times \text{SIN } \theta_X \approx \{(Xd+Xe)/2\} - Xc \qquad \text{(Expression 1)}$$

In step S606, the CPU 3 obtains (estimates) the user's viewpoint (the position at which the line of vision is focused; the position at which the user is looking) in the image for visual recognition displayed at the display device 10 using the rotation angles θx and θy calculated in step S605. Assuming that the coordinates of the viewpoint (Hx, Hy) are the coordinates corresponding to the pupil center c, the coordinates of the viewpoint (Hx, Hy) can be calculated using the following Expressions 2 and 3.

$$Hx = m \times (Ax \times \theta x + Bx) \qquad \text{(Expression 2)}$$

$$Hy = m \times (Ay \times \theta y + By) \qquad \text{(Expression 3)}$$

The parameter m in Expressions 2 and 3 is a constant determined by the configuration of the view finder optical system (the light receiving lens 16 and other elements) of the camera 1. The parameter m is a conversion factor used to convert the rotation angles θx and θy to the coordinates corresponding to the pupil center c in the image for visual recognition and is determined in advance and stored in the memory unit 4. The parameters Ax, Bx, Ay, and By are line-of-vision correction parameters used to correct individual differences in line of vision and these parameters are obtained by performing the calibration operation which will be described and stored in the memory unit 4 before the start of the line-of-vision detecting operation.

In step S607, the CPU 3 stores the coordinates of the viewpoint (Hx, Hy) in the memory unit 4 and ends the line-of-vision detecting operation.

The above description is about the method for obtaining the coordinates of the viewpoint (gazing point) on the display device by using the corneal reflex images of the light sources 13a and 13b while any other methods for obtaining the coordinates of the viewpoint (an eyeball rotation angle) from the captured eye image may be used.

<Description of Calibration Operation>

As described above, the viewpoint can be estimated by obtaining the rotation angles θx and θy of the eyeball 14 from the eye image in the line-of-vision detecting operation and transforming the coordinates of the pupil center c to its position on the image for visual recognition.

Figure 3B:
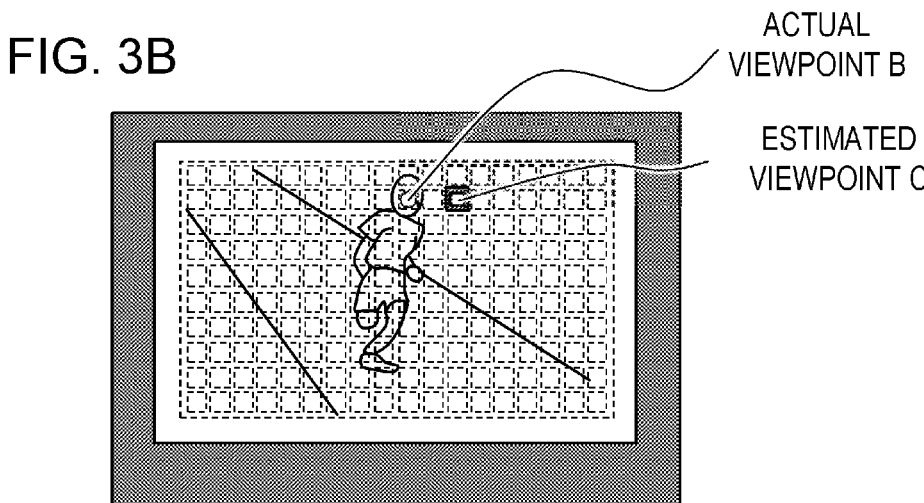

However, the viewpoint cannot be estimated with high accuracy due to factors such as individual differences in the shapes of human eyes in some cases. Specifically, if the line-of-vision correction parameters Ax, Ay, Bx, and By are not adjusted to values appropriate for the user, a gap may be generated between an actual viewpoint B and an estimated viewpoint C as shown in FIG. 3B. In FIG. 3B, the user gazes at a person, but the camera 1 incorrectly estimates that the user's line of vision is at the background, and proper focus detection and adjustment cannot be performed in the state.

Therefore, before the camera 1 takes images, calibration work must be carried out to obtain viewpoint correction parameters suitable for the user and store the parameters in the camera 1.

Figure 3C:
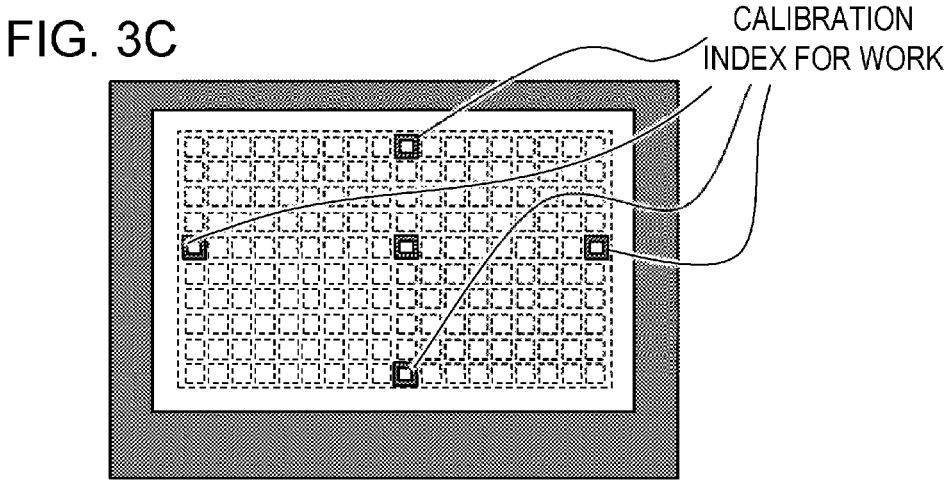

Conventionally, the calibration work has been performed by highlighting multiple indicators in different positions as shown in FIG. 3C in the image for visual recognition before image-sensing and asking the user to look at the indicators. It has been known to perform line-of-vision detecting operation while the user's line of vision is at each indicator and obtain a viewpoint correction parameter suitable for the user on the basis of the multiple calculated viewpoints (estimated positions) and the coordinates of the indicators. If the position that the user should look at is suggested, it does not have to be indicated by an indicator, and the position may be emphasized by changing the brightness or color.

<Conventional Tracking Processing (Conventional Method)>

FIGS. 7A to 7D show examples of display in a frame image 701 by the conventional method. In the frame image 701, a subject 702 and a subject GUI 703 which indicates an area for tracking the subject are displayed. The subject GUI 703 is a GUI image indicating the area identified by the camera as a moving subject (a subject recognition area; a recognition area). The user indicates to the camera that the subject 702 is the subject to be tracked for example by touching the screen and takes a video while capturing the subject on the screen.

Figure 7A:
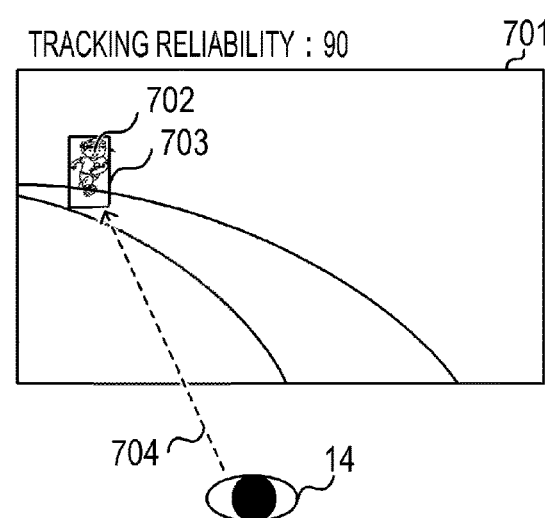
FIGS. 7A to 7D illustrate examples of display of a conventional live view image.
Figure 7B:
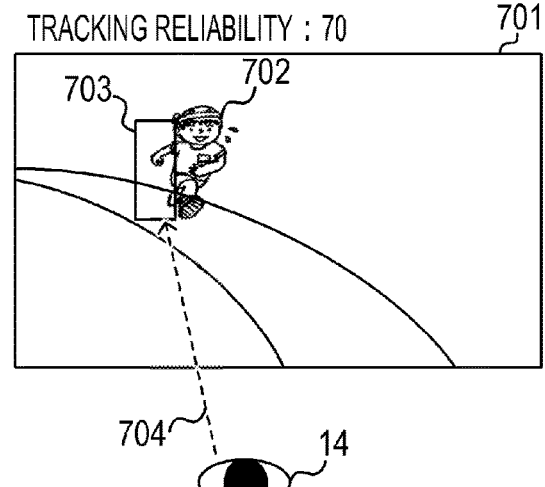
Figure 7C:
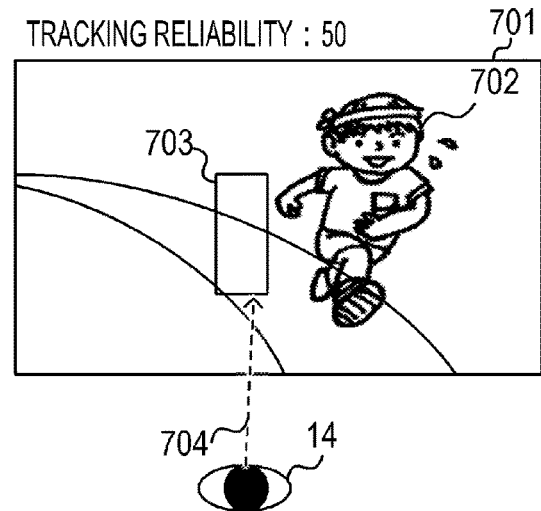
Figure 7D:
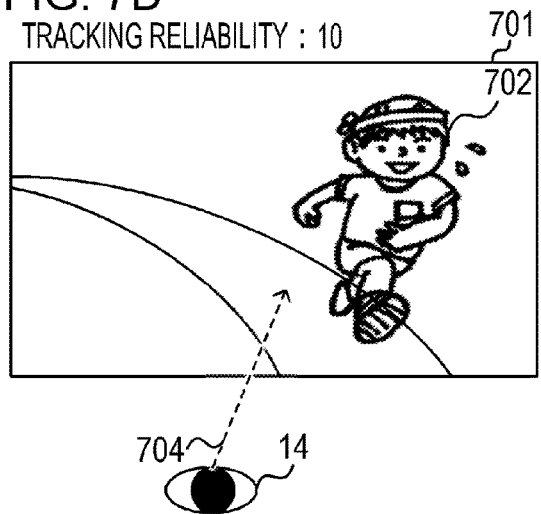

FIG. 7A shows the state just after the camera starts tracking the object (subject) to be tracked, and the subject 702 and the subject GUI 703 coincide. At the time, the tracking reliability (for example from 0% to 100%), which indicates the degree of similarity between the subject 702 and the area surrounded by the subject GUI 703 (the certainty of the subject recognition area) is high. The tracking reliability can also be considered as the reliability of the position of the subject GUI 703. FIGS. 7B and 7C illustrate how the subject GUI 703 can be gradually apart from the subject 702 as the subject 702 moves at a high speed or merges with a background object. In FIG. 7D, the subject GUI 703 is not displayed as the tracking reliability is below the threshold value Th and the tracking processing is stopped.

As described above, it may not be able to track the subject 702 by the conventional tracking processing when the subject moves at a high speed or merges with a background object. Here, the subject recognition area may be adjusted on the basis of the user's line of vision 704 in the processing for tracking the subject 702. As shown in FIG. 7D, once the subject GUI 703 is no longer displayed, the line of vision 704 should more easily capture the subject 702, and therefore it may be useful to adjust the subject recognition area on the basis of the user's line of vision 704. However, as shown in FIG. 7C, when the subject GUI 703 shifted from the subject 702 is displayed, the line of vision 704 tends to be directed to the subject GUI 703 and is less likely to be kept on the subject 702. Therefore, if the subject recognition area is adjusted on the basis of the line of vision 704 in the frame image shown in FIG. 7C, a gap may be generated between the subject recognition area and the actual subject.

<Tracking Processing Using Viewpoint (Embodiment)>

Figure 8:
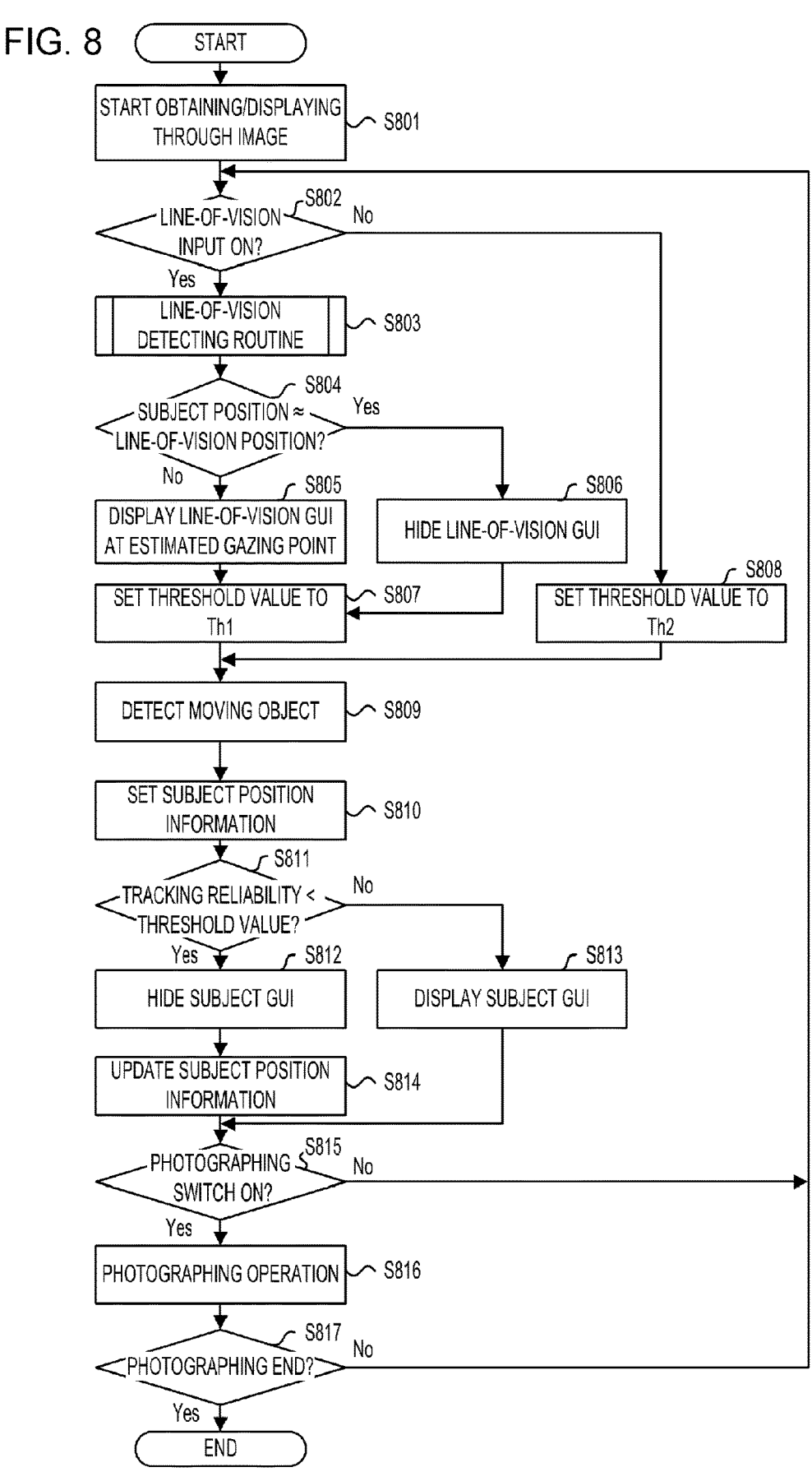
FIG. 8 is a flowchart for illustrating tracking processing according to a first embodiment of the invention.

FIG. 8 is a flowchart for illustrating exemplary tracking processing according to the embodiment. Processing steps in the flowchart are carried out when the CPU 3 executes the program stored in the memory unit 4. According to the embodiment, the processing in this flowchart starts when the power supply of the camera is turned on.

In step S801, when the power supply of the camera is turned on and the image-sensing device 2 starts to obtain a through image (an input image), the CPU 3 starts to display the through image on the display device 10. According to the embodiment, the user visually recognizes the subject by viewing the through image displayed on the display device 10 in the view finder.

In step S802, the CPU 3 determines whether the line of vision input is on. According to the embodiment, the CPU 3 determines that the line of vision input is on when the line-of-vision detecting function (the line of vision input function) is on. The process proceeds to step S803 if the line of vision input is on, and if not, the process proceeds to step S808.

In step S803, the CPU 3 executes the line-of-vision detecting routine shown in FIG. 6. According to the embodiment, as the line-of-vision detecting routine shown in FIG. 6 is executed, the coordinates (Hx, Hy) of the viewpoint on the display device 10 are obtained.

In step S804, the CPU 3 determines whether the subject GUI indicating the position of the subject and the line-of-vision GUI indicating the viewpoint (the position of the line of vision; an estimated gazing point) overlap. If they overlap, the process proceeds to step S806, and if not, the process proceeds to step S805. The subject GUI and the line-of-vision GUI overlap for example when a line which is the subject GUI and a line which is the line-of-vision GUI cross or when each of a region of the subject GUI and a region of the line-of-vision GUI includes at least a portion of the other. The subject GUI is displayed in the following step S813, the process proceeds to step S805 if the subject GUI is not displayed (for example immediately after the start of the processing).

In step S805, the CPU 3 displays the line-of-vision GUI on the display device 10. According to the embodiment, the line-of-vision GUI is a frame surrounding the position of the user's line of vision.

In step S806, the CPU 3 hides the line-of-vision GUI. This is because if the subject GUI and the line-of-vision GUI overlap on the subject in display, the subject may not be clearly viewed, which may cause discomfort to the user. It is only necessary to make the subject GUI easier to view, and the line-of-vision GUI can be lighter in color or smaller in size, so that the line-of-vision GUI can be less noticeable.

In step S807, the CPU 3 sets the threshold value Th to a threshold value Th1. In step S808, the CPU 3 sets the threshold value Th to a threshold value Th2 (<the threshold value Th1). As will be described in detail, according to the embodiment, the subject GUI is erased (hidden) when the tracking reliability is equal to or less than the threshold value Th in order to prevent the line of vision from turning to the subject GUI shifted from the subject. Therefore, the threshold value Th1 for detecting the viewpoint is larger than the threshold value Th2 for the case without detecting the viewpoint. This makes it possible to quickly detect the beginning of the shift of the subject GUI and to easily direct the line of vision to the subject when detecting the viewpoint. In the following description of the embodiment, the threshold value Th1 is 70% and the threshold value Th2 is 50% by way of illustration.

In step S809, the CPU 3 controls the tracking processing circuit 207 to perform moving object detection (tracking processing). It can be considered that the CPU 3 extracts the position of the object not on the basis of the viewpoint. Various existing methods can be applied as the moving object detecting method. For example, as described above, matching processing is performed between frames, and the area with the highest similarity (correlation) between frames is detected as the subject recognition area. The CPU 3 also controls the tracking processing circuit 207 to calculate the tracking reliability according to the similarity corresponding to the detected area. The tracking reliability increases as the similarity increases.

In step S810, the CPU 3 sets the result in step S809 (the detection result of the area of the moving object) as subject position information. The subject position information is used, for example, as a range-finding point.

In step S811, the CPU 3 determines whether the tracking reliability is lower than the threshold value Th. If the tracking reliability is lower than the threshold value Th, the process proceeds to step S812 and if not, the process proceeds to step S813. Here, a case where the tracking reliability is lower than the threshold value Th is a case where the subject position and the subject GUI position are shifted from each other. A case where the tracking reliability is higher than the threshold value Th is a case where the positions of the subject and the subject GUI substantially coincide.

In step S812, the CPU 3 hides the subject GUI. It is only necessary to prevent the line of vision from turning to the subject GUI, and the subject GUI may be made less noticeable by making the subject GUI lighter in color or smaller in size. In addition to the subject GUI, an OSD (On Screen Display) that displays photographing setting information on the photographing screen may be displayed as a GUI in some cases. The OSD may also interfere with the tracking processing with line-of-vision information because the line of vision may be moved away from the subject, and therefore, it is preferable to change the display state of the OSD (to make the OSD less noticeable) similarly to the subject GUI. If the subject GUI is hidden and only the line-of-vision GUI is displayed, it is also easier for the user to be aware that the tracking processing is being carried out by the line-of-vision input.

In step S813, the CPU 3 displays the subject GUI. This is because it is highly possible that the position of the subject and the position of the subject GUI substantially coincide.

In step S814, the CPU 3 updates the subject position information on the basis of the line-of-vision information. Here, since the subject GUI is hidden in step S812, it is highly possible that the user gazes at the subject. Therefore, the subject recognition area is corrected by carrying out weighted addition to the line of vision position and the position of the subject recognition area to reduce the shift between the subject recognition area and the subject. Note that the area including the position of the line of vision (the area corresponding to the line-of-vision GUI) may be used as the subject recognition area as it is. When the reliability is lower than the threshold value Th, it can be considered that the CPU 3 detects the position of the object which have been extracted not on the basis of the viewpoint in step S809 and corrected on the basis of the viewpoint as the subject recognition area (a position detected on the basis of the viewpoint). If the reliability is higher than the threshold value Th, it can be considered that the CPU 3 detects the position of the object extracted (without correction based on the line of vision) as the subject recognition area (a position detected not on the basis of the line of vision).

In step S815, the CPU 3 detects whether a photographing switch (not shown) has been turned on by the user. If the switch has been turned on, the process proceeds to step S816, and if not, the process returns to step S802.

In step S816, the CPU 3 performs photographing operation. Specifically, the CPU 3 records an image signal obtained by the image-sensing device 2 in the memory unit 4.

In step S817, the CPU 3 determines whether the photographing has been completed. If the photographing has been completed, the flow of the processing ends, and if not, the process returns to step S802. The photographing is finished, for example when the power supply is turned off.

FIGS. 9A to 9D illustrate exemplary frame images 701 in a moving image or live view according to the embodiment.

In FIG. 9A, the subject 702 and the subject GUI 703 coincide immediately after the subject 702 as a moving object starts to be tracked. At the time, the tracking reliability is high (for example 90%). In FIG. 9A, an OSD 901 and a line-of-vision GUI 905 are also displayed. Here, the threshold value Th is the threshold value Th1 (for example 70%) because the line-of-vision detecting function is on.

In FIG. 9B, the position of the subject 702 starts to be shifted from the subject GUI 703, but the tracking reliability (for example 80%) is higher than the threshold value Th (threshold Th1). Also, in FIG. 9B, the subject GUI 703 and the line-of-vision GUI 905 overlap each other. When the line-of-vision GUI 905 and the subject GUI 703 overlap, the information becomes complicated, which may cause discomfort to the user. When the GUI 703 and the subject GUI 905 overlap, the priority is given to the visibility of the subject GUI 703 (in the example in FIG. 9B, the line-of-vision GUI 905 is hidden).

In FIG. 9C, the position of the subject 702 and the subject GUI 703 are greatly shifted from each other, and the tracking reliability (for example 60%) is less than the threshold value Th (the threshold value Th1). In the example in FIG. 9C, the subject GUI 703 is hidden and less noticeable. Also, in the example in FIG. 9C, the color of the OSD 901 is lightened to be less noticeable. According to the embodiment, when the line-of-vision detecting function is on, the beginning of the shift of the subject GUI 703 is quickly detected by using the relatively large threshold value Th1. When the beginning of the shift of the subject GUI 703 is detected, the subject GUI 703 is hidden or the color of the OSD 901 is lightened, so that the user is less likely to look at the subject GUI 703 or the OSD 901 and the user's line of vision is more easily directed to the subject 702.

In FIG. 9D, as a result of the tracking processing carried out on the basis of the position of the line of vision, the position of the subject GUI 703 and the position of the subject 702 again substantially coincide. In the example in FIG. 9D, the tracking reliability (for example 90%) is higher than the threshold value Th (threshold value Th1), the subject GUI 703 is displayed again, and the OSD 901 regains its normal color. In the example in FIG. 9D, the line-of-vision GUI 905 is hidden because it overlaps the subject GUI 703.

As described above, according to the embodiment, when the line-of-vision detecting function is on, the threshold value Th for evaluating the tracking reliability is increased. In this way, the beginning of the shift between the subject GUI and the subject's position is quickly detected, and the subject GUI 703 is made to look less noticeable, so that the user's line of vision is more easily directed to the subject, which improves the accuracy of the tracking processing using the line-of-vision information. In addition, when the subject GUI is less noticeable, the user is made aware that tracking processing is being performed using line-of-vision information, so that it can be easier for the user to gaze at the subject.

Second Embodiment

In the description of the first embodiment, the line-of-vision GUI is always displayed, except when the position of the subject GUI and the line of vision position overlap, while according to this embodiment, the line-of-vision GUI is displayed only when tracking processing is performed using the line-of-vision information by way of illustration.

Figure 10:
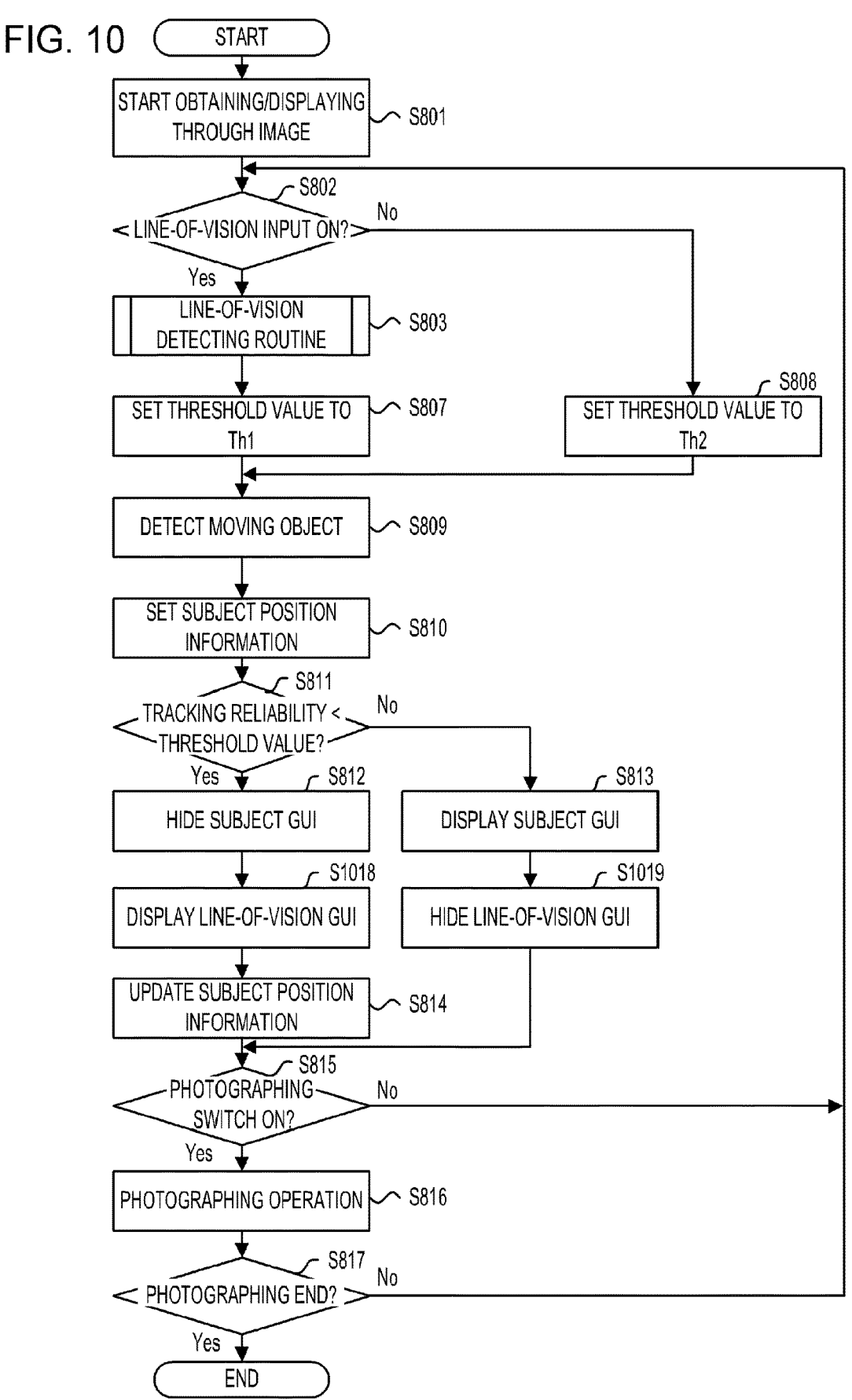
FIG. 10 is a flowchart for illustrating tracking processing according to a second embodiment of the invention.

FIG. 10 is a flowchart for illustrating exemplary tracking processing according to the embodiment. Processing steps in this flowchart are carried out as the CPU 3 executes a program stored in the memory unit 4. According to the embodiment, the processing in the flowchart starts when the power supply of the camera is turned on. The same processing steps as those shown in FIG. 8 are indicated by same reference numbers and their description will not be provided.

According to the embodiment, steps S804 to S806 shown in FIG. 8 are not performed, and therefore the processing of displaying or hiding the line-of-vision GUI is not performed immediately after the line-of-vision detecting routine is performed. The line-of-vision GUI is displayed in the timing in which the tracking reliability falls below the threshold value Th in step S811 and after the subject GUI 703 is hidden (step S1018). The line-of-vision GUI is hidden in the timing in which the tracking reliability exceeds the threshold value Th in step S811 and after the subject GUI 703 is displayed (step S1019).

In this way, it is possible to make the user aware that the tracking processing is being performed using the line-of-vision information without displaying the line-of-vision GUI more than necessary and causing discomfort to the user.

FIGS. 11A to 11D each illustrate the frame image 701 in a moving image or a live view according to the embodiment.

Figure 11A:
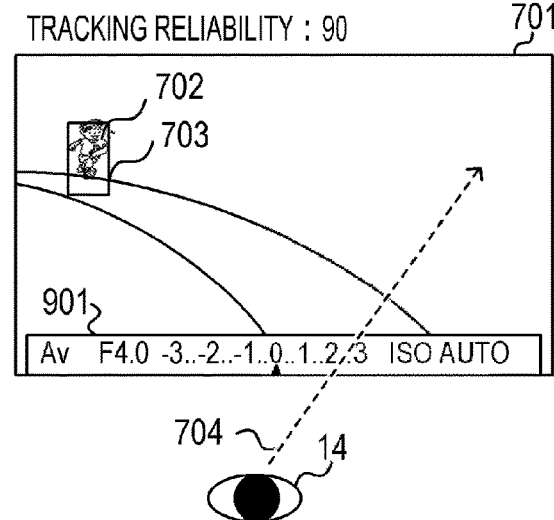
FIGS. 11A to 11D illustrate examples of display of a live view image according to the second embodiment.
Figure 11B:
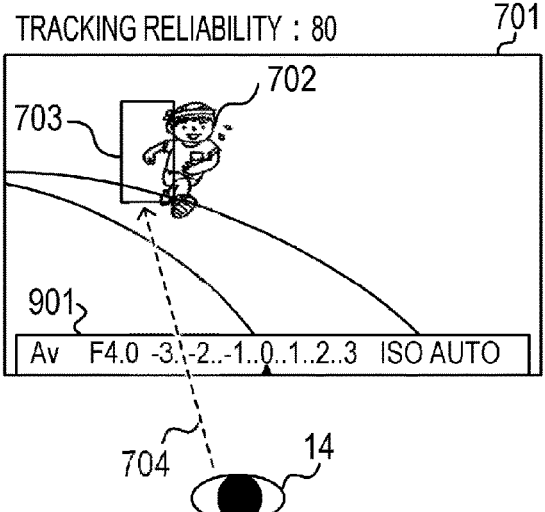

FIG. 11A shows the state immediately after the start of tracking the subject 702 as a moving object, and the subject 702 and the subject GUI 703 substantially coincide (the tracking reliability is higher than the threshold Th1). In this case, if the line-of-vision GUI 905 and the subject GUI 703 are displayed on the display device 10 at the same time, the information on the display device 10 becomes complicated and may cause discomfort to the user, and therefore, unlike the first embodiment, the line-of-vision GUI 905 is not displayed.

Figure 11C:
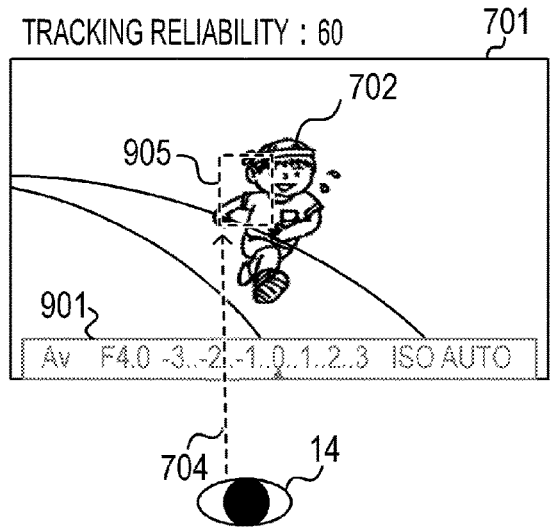
Figure 11D:
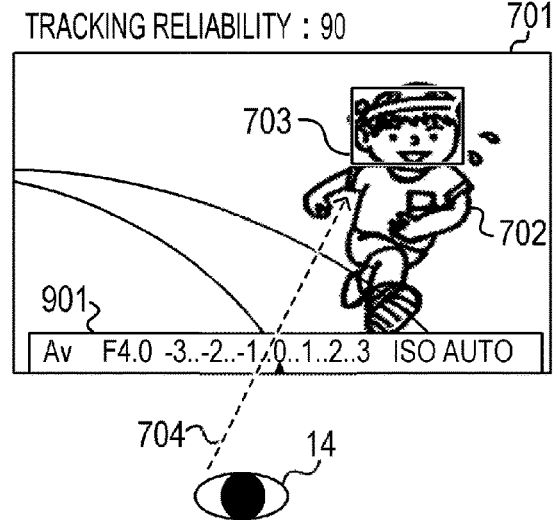

FIG. 11C shows the state in which the tracking reliability is less than the threshold value Th (Yes in step S811). In this case, the line-of-vision GUI 905 is displayed in order to make the user aware that the tracking processing is performed using the line-of-vision information. Meanwhile, in FIGS. 11B and 11D, since the tracking reliability is higher than the threshold value Th (No in step S811), the line-of-vision GUI 905 is hidden similarly to FIG. 11A.

As described above, according to the embodiment, the line-of-vision GUI is displayed only when the line-of-vision information is used for the tracking processing. In this way, the accuracy of the tracking processing using the line-of-vision information can be improved by making it easier to direct the user's line of vision to the subject while reducing the complexity of the information displayed on the display device 10. The user can be made aware that the tracking processing is being performed using the line-of-vision information.

Third Embodiment

In the above description of the embodiment, the line-of-vision information is used by way of illustration when tracking a moving object, while in the following description of this embodiment, the line-of-vision information is used when detecting a face.

Figure 12:
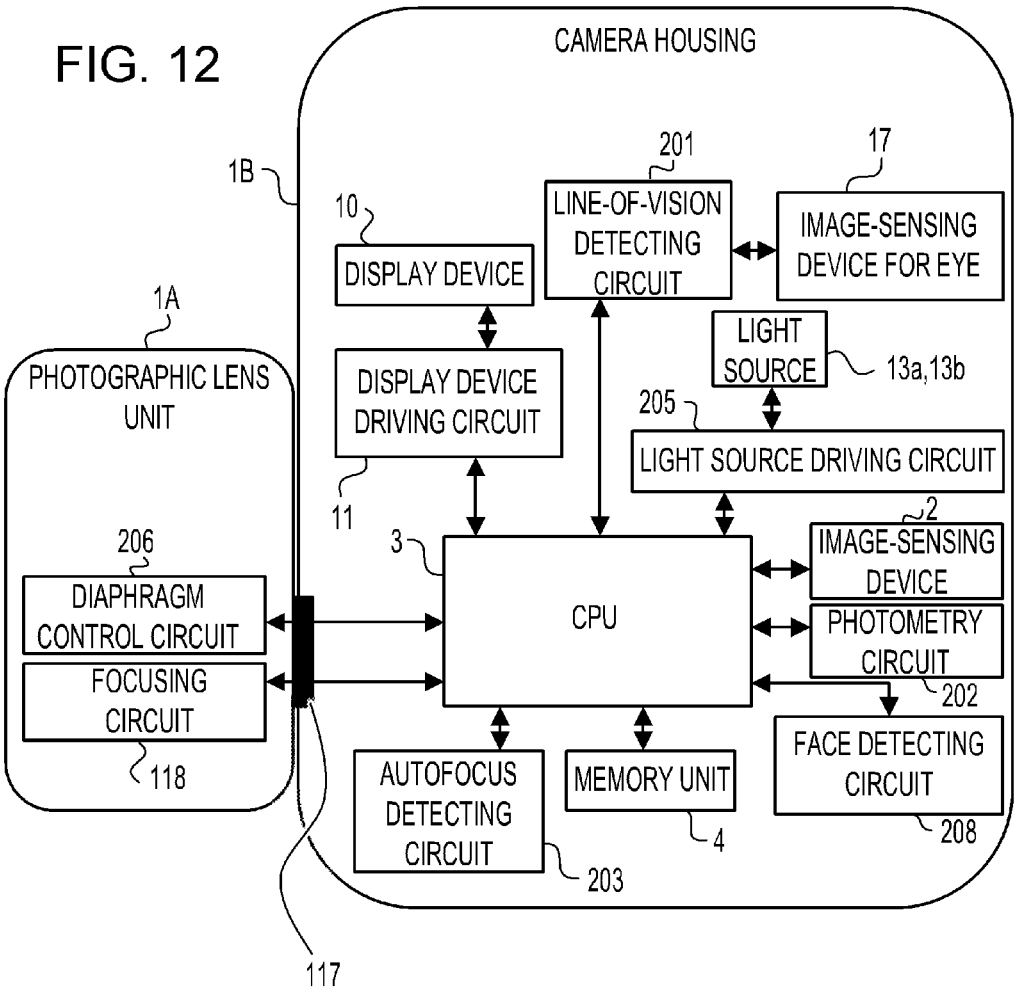
FIG. 12 is a block diagram of a camera according to a third embodiment of the invention.

FIG. 12 is a block diagram of the electrical configuration in the camera 1 according to the embodiment. In FIG. 12, a face detecting circuit 208 is provided instead of the tracking processing circuit 207 in FIG. 2.

Using template data on a human face stored in the memory unit 4 in advance, the face detecting circuit 208 detects, as a face image, the part (area) of the frame image having similarity to the template which exceeds a reference value. The face detecting method is not limited to the above, and various known techniques can be applied.

FIG. 13 is a flowchart for illustrating the face detecting processing according to the embodiment. Processing steps in the flowchart are carried out as the CPU 3 executes a program stored in the memory unit 4. According to the embodiment, the processing in the flowchart starts when the power supply of the camera is turned on. The same processing steps as those shown in FIG. 8 are designated by the same reference numbers and their description will not be provided.

In step S1304, the CPU 3 determines whether the face GUI indicating the position of the face and the line-of-vision GUI overlap each other. If they overlap, the process proceeds to step S806, and if not, the process proceeds to step S805. For example, the face GUI and the line-of-vision GUI overlap when a line which is the face GUI and a line which is the line-of-vision GUI crosses or one of a region of the face GUI and a region of the line-of-vision GUI include at least a part of the other. Since the face GUI is displayed in the step S1313 which will be described, the process proceeds to step S805 if the face GUI is not displayed (for example immediately after the start of the processing).

In step S1307, the CPU 3 sets the threshold value Th to the threshold value Th1. In step S1308, the CPU 3 sets the threshold value Th to the threshold value Th2 (<the threshold value Th1). According to the embodiment, the face GUI is erased (hidden) when the face reliability is equal to or less than the threshold value Th by the processing which will be described in order to prevent the line of vision from turning to the face GUI shifted from the face. Therefore, the threshold value Th (the threshold value Th1) for the case where the viewpoint is detected is larger than the threshold value Th (the threshold value Th2) for the case where the viewpoint is not detected. In this way, the beginning of the shift of the face GUI can be detected and the line of vision can be easily directed to the face when detecting the viewpoint. In the following description of the embodiment, the threshold value Th1 is 70% and the threshold value Th2 is 50% by way of illustration.

In step S1309, the CPU 3 controls the face detecting circuit 208 to detect the face. Various existing face detecting methods can be applied. For example, in the image of the current frame, matching processing is performed with the reference image, and the area having the highest similarity (correlation) with the reference image is extracted. The reference image is, for example, a template image of a face that has been stored in advance in the memory unit 4. The CPU 3 also controls the face detecting circuit 208 to calculate face reliability according to the similarity corresponding to the detected area. The face reliability increases as the similarity increases.

In step S1310, the CPU 3 sets, as face position information, the result in step S1309 (the detection result of the face area). The face position information is used for example as a range-finding point.

In step S1311, the CPU 3 determines whether the face reliability is lower than the threshold value Th. If the face reliability is lower than the threshold value Th, the process proceeds to step S812 and if not, the process proceeds to step S813. Here, a case where the face reliability is lower than the threshold value Th is a case where the face position and the position of the face GUI are shifted from each other. A case where the face reliability is higher than the threshold value Th is a case where the face position and the position of the face GUI substantially coincide.

In step S1312, the CPU 3 hides the face GUI. This is because there is a high possibility that the face position and the position of the face GUI are greatly apart from each other. It is only necessary to prevent the line of vision from turning at the face GUI, and therefore the face GUI may be made less noticeable by making the face GUI lighter in color or smaller in size. It is preferable to change the display appearance of the OSD (to make it less noticeable) similarly to the first embodiment. It is also possible to make it easier for the user to be aware that the face detecting processing is being performed by line-of-vision input when the face GUI is hidden and only the line-of-vision GUI is displayed.

In step S1313, the CPU 3 displays the face GUI. This is because there is a high possibility that the position of the face and the position of the face GUI substantially coincide.

In step S1314, the CPU 3 updates the face position information on the basis of the line-of-vision information. For example, the face recognition area is corrected by performing weighted-addition to the position of the line of vision and the position of the area recognized as a face (a face recognition area) and reducing the shift between the face recognition area and the face. Note that the area including the position of the line of vision (the area corresponding to the line-of-vision GUI) may be used as the face recognition area as it is.

As in the foregoing, according to the embodiment, when the line-of-vision detecting function is used, the threshold value for the face reliability is increased, so that the beginning of the shift between the face GUI and the face position can be quickly detected, and the face GUI may be hidden. In this way, the accuracy of the face detecting processing using the line-of-vision information can be improved because the line of vision more easily turns to the face.

Modifications

In the above description of the embodiments, the GUI is hidden, reduced in size, or made lighter in color in order to make the GUI less noticeable, but the methods are not limited to the above. For example, the GUI may be made less noticeable by changing the brightness or color according to the background (to make the brightness or color closer to the brightness or color of the background) or by increasing the transmittance (transparency) of the GUI.

In the above description of the embodiments, when the subject GUI and the line-of-vision GUI which indicates the position of the line of vision overlap, the subject GUI can be made noticeable, and the line-of-vision GUI is made less noticeable by way of illustration. However, the subject GUI may be made less noticeable in order to make the line-of-vision GUI more noticeable. Specifically, when the subject GUI and the line-of-vision GUI which indicates the position of the line of vision overlap, the subject GUI may be made less noticeable for example by changing its brightness, color, or size.

In the above description of the embodiments, when the camera performs subject tracking processing or face detecting processing, the subject GUI and the face GUI are made less noticeable to make it easier to direct the user's line of vision to a desired area (an area including the subject or the face). However, the present invention can also be applied to cases where tracking or face detecting processing is not performed. For example, if a GUI image is displayed in an area different from a desired area when it is performed to detect the user's viewpoint (the position of the line of vision) in the display device, the user's eye is likely to turn to the GUI image. Therefore, in order to make it easier to direct the user's line of vision to the desired area, the GUI image may be made less noticeable when it is performed to detect the user's viewpoint (the position of the line of vision) than when it is not performed to detect the viewpoint. For example, it may be considered that the present invention concerns an electronic apparatus including a display control unit and detecting unit as follows. Here, the display control unit displays an input image and a GUI image on a display unit. The detecting unit detects the user's viewpoint in the input image. When the detecting unit performs to detect the viewpoint, the display control unit makes the GUI image less noticeable than when the detecting unit does not perform to detect the viewpoint.

In the above description of the embodiments, the present invention is applied to a camera by way of illustration but there are other applications. For example, the present invention can be applied to any electronic apparatus that can receive line of vision input. For example, the present invention can be applied to a personal computer, a PDA, a mobile phone terminal, a display, or an HMD (head mounted display).

According to the present invention, the user's line of vision can be more easily directed to a desired region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited by the above-described embodiments, and various modifications and variations are possible without departing from the spirit and scope of the present invention. Therefore, the following claims are appended to publicly disclose the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus comprising at least one memory and at least one processor which function as a plurality of units comprising:

a setting unit configured to set a position for displaying a first GUI image;

a display control unit configured to display, on a display, the first GUI image and a second GUI image, the second GUI image being displayed on a basis of detection of a viewpoint of a user;

a determination unit configured to determine whether the first GUI image and the second GUI image overlap;

a first detecting unit configured to detect a position of a predetermined object in an input image; and a second detecting unit configured to detect the viewpoint of the user in the input image, wherein in a case where it is determined that the first GUI image and the second GUI image overlap, the display control unit makes the second GUI image less noticeable than in a case where it is determined that the first GUI image and the second GUI image do not overlap, wherein the display control unit (1) displays the first GUI image at a position corresponding to the position of the predetermined object detected by the first detecting unit and (2) displays the second GUI image at a position corresponding to the viewpoint detected by the second detecting unit, wherein in a case where (a) a position of the predetermined object has been obtained without using the viewpoint and (b) reliability of the obtained position is lower than a threshold value, the first detecting unit detects the position of the predetermined object on the basis of the viewpoint, and wherein the display control unit (1) displays the second GUI image representing the viewpoint of the user in the input image in a case where the reliability is lower than the threshold value and (2) does not display the second GUI image representing the viewpoint of the user in the input image in a case where the reliability is higher than the threshold value.

2. The electronic apparatus according to claim 1, wherein in a case where the position of the predetermined object is detected on the basis of the viewpoint, the display control unit does not display the second GUI image.

3. The electronic apparatus according to claim 1, wherein the first detecting unit tracks the predetermined object using a frame image which forms the input image.

4. The electronic apparatus according to claim 1, wherein the predetermined object is a face.

5. The electronic apparatus according to claim 1, wherein the first detecting unit extracts the position of the predetermined object without using the viewpoint, wherein in a case where reliability of the extracted position is lower than a threshold value, the first detecting unit (1) corrects the extracted position on the basis of the viewpoint and (2) detects, as the position of the predetermined object, the corrected extracted position, and wherein in a case where the reliability is higher than the threshold value, the first detecting unit detects, as the position of the predetermined object, the extracted position without correcting the extracted position on the basis of the viewpoint.

6. The electronic apparatus according to claim 1, wherein the threshold value in a case where the second detecting unit detects the viewpoint is greater than in a case where the viewpoint is not detected.

7. The electronic apparatus according to claim 1, wherein in a case where it is determined that the first GUI image and the second GUI image overlap, the display control unit changes at least one of brightness, color, size, and transparency of the first GUI image so that the first GUI image is more noticeable than the second GUI image.

8. The electronic apparatus according to claim 1, wherein in a case where it is determined that the first GUI image and the second GUI image overlap, the display control unit changes at least one of brightness, color, size, and transparency of the second GUI image so that the second GUI image is less noticeable than the first GUI image.

9. The electronic apparatus according to claim 1, wherein in a case where it is determined that the first GUI image and the second GUI image overlap, the display control unit does not display the second GUI image.

10. A method for controlling an electronic apparatus, the method comprising:

a setting step of setting a position for displaying a first GUI image;

a display control step of displaying the first GUI image and a second GUI image on a display, the second GUI image being displayed on a basis of detection of a viewpoint of a user;

a determining step of determining whether the first GUI image and the second GUI image overlap;

a first detecting step of detecting a position of a predetermined object in an input image; and a second detecting step of detecting a position detect the viewpoint of the user in the input image, wherein in the display control step, in a case where it is determined that the first GUI image and the second GUI image overlap, the second GUI image is made less noticeable than in a case where it is determined that the first GUI image and the second GUI image do not overlap, wherein in the display control step, (1) the first GUI image is displayed at a position corresponding to the position of the predetermined object detected in the first detecting step and (2) the second GUI image is displayed at a position corresponding to the viewpoint detected in the second detecting step, wherein in a case where (a) a position of the predetermined object has been obtained without using the viewpoint and (b) reliability of the obtained position is lower than a threshold value, the position of the predetermined object is detected on the basis of the viewpoint in the first detecting step, and wherein in the display control step, (1) the second GUI image representing the viewpoint of the user in the input image is displayed in a case where the reliability is lower than the threshold value and (2) the second GUI image representing the viewpoint of the user in the input image is not displayed in a case where the reliability is higher than the threshold value.

11. A non-transitory computer-readable storage medium that stores a program, wherein the program causes a computer to execute a method for controlling an electronic apparatus, the method comprising:

a setting step of setting a position for displaying a first GUI image;

a display control step of displaying the first GUI image and a second GUI image on a display, the second GUI image being displayed on a basis of detection of a viewpoint of a user;

a determining step of determining whether the first GUI image and the second GUI image overlap;

a first detecting step of detecting a position of a predetermined object in an input image; and a second detecting step of detecting a position detect the viewpoint of the user in the input image, wherein in the display control step, in a case where it is determined that the first GUI image and the second GUI image overlap, the second GUI image is made less noticeable than in a case where it is determined that the first GUI image and the second GUI image do not overlap, wherein in the display control step, (1) the first GUI image is displayed at a position corresponding to the position of the predetermined object detected in the first detecting step and (2) the second GUI image is displayed at a position corresponding to the viewpoint detected in the second detecting step, wherein in a case where (a) a position of the predetermined object has been obtained without using the viewpoint and (b) reliability of the obtained position is lower than a threshold value, the position of the predetermined object is detected on the basis of the viewpoint in the first detecting step, and wherein in the display control step, (1) the second GUI image representing the viewpoint of the user in the input image is displayed in a case where the reliability is lower than the threshold value and (2) the second GUI image representing the viewpoint of the user in the input image is not displayed in a case where the reliability is higher than the threshold value.

* * * * *